United States Patent
Wang

(10) Patent No.: US 9,700,145 B1
(45) Date of Patent: Jul. 11, 2017

(54) QUICK ASSEMBLY ARMREST CONNECTING DEVICE

(71) Applicant: CHUAN HSING CHEMICAL INDUSTRY CO., LTD., Taichung (TW)

(72) Inventor: Ching-Chang Wang, Taichung (TW)

(73) Assignee: Chuan Hsing Chemical Industry Co., Ltd., Taichung (TW)

( * ) Notice: Subject to any disclaimer, the term of this patent is extended or adjusted under 35 U.S.C. 154(b) by 0 days.

(21) Appl. No.: 15/151,525

(22) Filed: May 11, 2016

(51) Int. Cl.
*A47C 7/54* (2006.01)
*F16B 21/09* (2006.01)

(52) U.S. Cl.
CPC .............. *A47C 7/546* (2013.01); *F16B 21/09* (2013.01)

(58) Field of Classification Search
CPC .. A47C 7/54; A47C 7/546; B60N 2/46; B60N 2/4673; F16B 21/09; Y10T 403/59; Y10T 403/591; Y10T 403/599; Y10T 403/60; Y10T 403/602; Y10T 403/604
See application file for complete search history.

(56) References Cited

U.S. PATENT DOCUMENTS

| 8,287,046 B1 * | 10/2012 | Wang | A47C 7/546 297/411.26 |
| 2005/0117965 A1 * | 6/2005 | Huang | F16B 7/0406 403/322.1 |
| 2014/0239696 A1 * | 8/2014 | Wang | A47C 1/03 297/411.23 |

FOREIGN PATENT DOCUMENTS

DE   102011122697 A1 *   6/2013   ............ F16B 12/125

* cited by examiner

*Primary Examiner* — Jonathan Masinick
(74) *Attorney, Agent, or Firm* — Alan D. Kamrath; Kamrath IP Lawfirm, P.A.

(57) ABSTRACT

A quick assembly armrest connecting device includes a connecting head and a receiving seat. The connecting head includes a body extending along a first axis. The receiving seat includes a groove extending along a second axis. The armrest connecting device is movable between an assembled position and a separated position in which the connecting head is separated from the receiving seat. When the armrest connecting device moves from the separated position towards the assembled position, the first axis is parallel to the second axis, and the connecting head moves rectilinearly along the second axis towards the receiving seat and inserts the body into the groove. After the connecting head abuts the bottom side of the groove, the connecting head moves rectilinearly in a radial direction of the second axis relative to the receiving seat, moving the armrest connecting device to the assembled position.

9 Claims, 8 Drawing Sheets

QUICK ASSEMBLY ARMREST CONNECTING DEVICE

BACKGROUND OF THE INVENTION

The present invention relates to a connecting device and, more particularly, to a quick assembly armrest connecting device that can be assembled quickly.

An armrest is generally mounted to each of two sides of a chair to support an arm of a user sitting in the chair. The armrests reduce the action of the gravity imparting from the drooping arms to the shoulders of the user, avoiding sore shoulders resulting from sedentariness and putting the body of the user in a more stable position.

A conventional armrest for a chair includes a supporting seat and a cover. An end of the supporting seat is mounted to a chair. The cover is integrally formed with the other end of the supporting seat opposite to the chair. Although the armrest of this design can omit the time for assembling the supporting seat and the cover, the processing procedure for the integral formation of the supporting seat and the cover is relatively troublesome and complicates the manufacture of the supporting seat and the mold for the cover, leading to a significant increase in the manufacturing costs, causing troubles in opening the mold, and causing difficulties in processing.

Furthermore, when the armrest is damaged, replacement of the whole armrest is necessary, because the supporting seat and the cover are integrally formed. This not only increases the cost burden but increases garbage as well as causing destruction to the environment.

Thus, the industry begins to manufacture the supporting seat and the cover separately and then fix them together by screwing which requires forming screw holes in the supporting seat and the cover and extending screws through the screw holes in the supporting seat and the cover. However, plural screw holes and plural screws are required to provide the desired fixing strength, and tools are required to fix the screws into the screw holes for assembly or to detach the screws from the screw holes for disassembly, causing significant inconvenience to the user and increasing the time cost.

Thus, a need exists for a novel armrest connecting device that mitigates and/or obviates the above disadvantages.

BRIEF SUMMARY OF THE INVENTION

A quick assembly armrest connecting device according to the present invention has two opposite sides respectively connected to a supporting frame and an armrest pad of an arrest. The armrest connecting device includes a connecting head and a receiving seat. The connecting head includes a body extending along a first axis. The receiving seat includes a groove extending along a second axis. The groove includes an opening. The groove further includes a top side formed on a side thereof adjacent to the opening. The groove further includes a bottom side spaced from the top side along the second axis.

The armrest connecting device is movable between a separated position and an assembled position. When the armrest connecting device is in the separated position, the connecting head is separated from the receiving seat. When the armrest connecting device moves from the separated position towards the assembled position, the first axis is parallel to the second axis, and the connecting head moves rectilinearly along the second axis towards the receiving seat and inserts the body into the groove. After the connecting head abuts the bottom side of the groove, the connecting head moves rectilinearly in a radial direction of the second axis relative to the receiving seat, moving the armrest connecting device to the assembled position.

The body can include a first side and a second side opposite to the first side along the first axis. A side of the body of the connecting head adjacent to the first side includes a first protrusive sliding edge extending in a radial direction of the first axis. The groove of the receiving seat is recessed in a radial direction of the second axis to form a first recessed sliding edge. The first recessed sliding edge extends from the top side to the bottom side. A side of the groove adjacent to the bottom side is recessed in a radial direction of the second axis to form a first recessed engagement edge. The first recessed engagement edge includes a side in communication with the first recessed sliding edge. The first recessed engagement edge further includes another side located adjacent to the top side and having a first stop edge contiguous to the first recessed sliding edge. When the armrest connecting device moves from the separated position towards the assembled position, the first protrusive sliding edge slides and aligns with the first recessed sliding edge. When the armrest connecting device is in the assembled position, the first protrusive sliding edge is inserted into the first recessed engagement edge.

The body can include a slot extending from the second side through the first side. The slot includes a first end located adjacent to the second side of the body and a second end located adjacent to the first side of the body. A width of the first end of the slot is larger than a width of the second end of the slot to form a stepped structure. The slot receives an engagement block and an elastic element. The engagement block is located adjacent to the first side of the body and selectively protrudes beyond an outer face of the body adjacent to the first side. The elastic element is located adjacent to the second side of the body and abuts the engagement block. A positioning groove is defined in the bottom side of the groove of the receiving seat and extends away from the top side along the second axis. The engagement block is inserted into the positioning groove when the armrest connecting device is in the assembled position.

A side of the body of the connecting head adjacent to the first side can include at least one second protrusive sliding edge extending in a radial direction of the first axis. The receiving seat can further include at least one second recessed sliding edge defined in a side of the bottom groove and extending in a radial direction of the second axis. The at least one second recessed sliding edge extends from the top side to the bottom side of the groove. A side of the groove of the receiving seat adjacent to the bottom side of the groove can include at least one second recessed engagement edge extending in a radial direction of the second axis. The at least one second recessed engagement edge has a first side intercommunicated with the second recessed sliding edge and a second side intercommunicated with the groove. A side of the at least one second recessed engagement edge adjacent to the top side includes a second stop edge. The second stop edge includes a first side contiguous to the at least one second recessed sliding edge and a second side contiguous to the groove. When the armrest connecting device moves from the separated position towards the assembled position, the at least one second protrusive sliding edge slides and aligns with the at least one second recessed sliding edge. When the armrest connecting device is in the assembled position, the at least one second protrusive edge is inserted into the at least one second recessed engagement edge.

In an example, the first protrusive sliding edge is located on an end of the body in the radial direction of the first axis. The at least one second protrusive sliding edge is located adjacent to the other end of the body opposite to the end of the body in the radial direction of the first axis. The first recessed sliding edge is located in an end of the groove in a radial direction of the second axis. The at least one second recessed sliding edge is located in the other end of the groove opposite to the end of the groove in the radial direction of the second axis.

In an example, the at least one second protrusive sliding edge includes two second protrusive sliding edges on opposite sides of the body in the radial direction of the first axis and extending away from each other. The at least one second recessed sliding edges includes two second recessed sliding edges on opposite sides of the groove in the radial direction of the second axis and extending away from each other. The at least one second recessed engagement edge includes two second recessed engagement edges respectively corresponding to the two second recessed sliding edges.

The body can further include two through-holes extending from the first side through the second side of the body and located on opposite sides of the slot. A fastener is mounted in each of the two through-holes and protrudes beyond an outer face of the body located adjacent to the second side of the body.

In an example, the connecting head is fixed and connected to the supporting frame, and the receiving seat is fixed to the armrest pad.

In another example, the connecting head is fixed and connected to the armrest pad, and the receiving seat is fixed and connected to the supporting frame.

In a further example, the connecting head is fixed and connected to the supporting frame by integral formation, and the receiving seat is fixed and connected to the armrest pad.

In still another example, the receiving seat is fixed and connected to the supporting frame by integral formation, and the receiving seat is fixed and connected to the supporting frame.

The present invention will become clearer in light of the following detailed description of illustrative embodiments of this invention described in connection with the drawings.

DETAILED DESCRIPTION OF THE INVENTION

Figure 1:
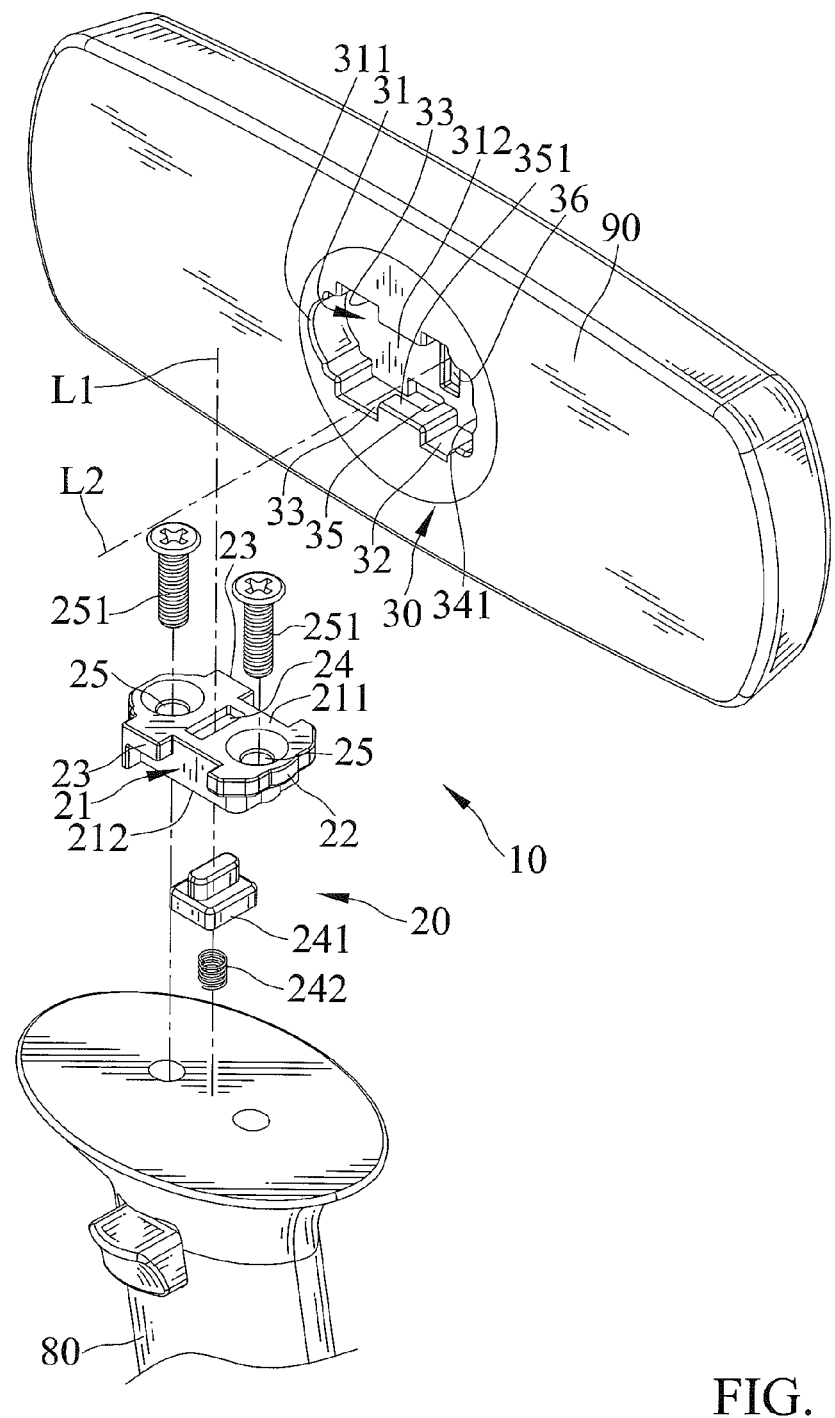
FIG. 1 is an exploded, perspective view of a quick assembly armrest connecting device of a first embodiment according to the present invention.
Figure 2:
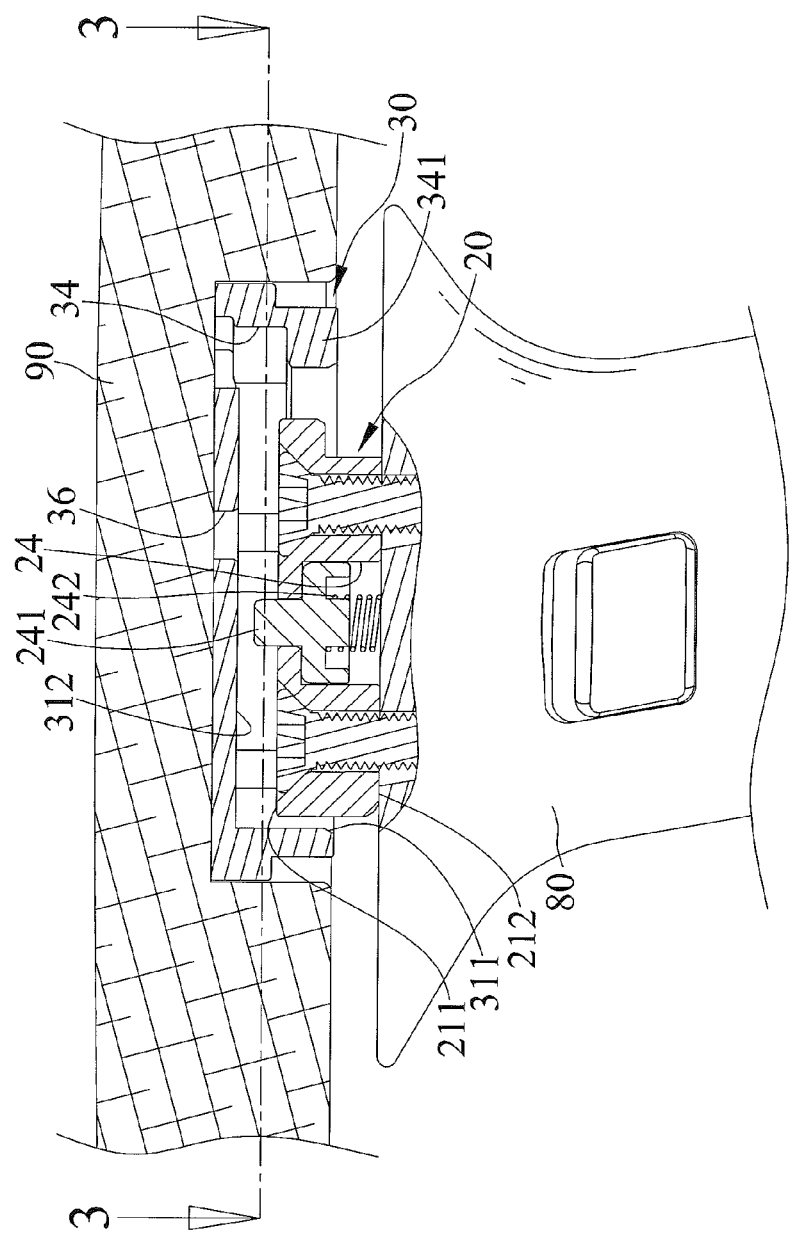
FIG. 2 is a diagrammatic view illustrating movement of the armrest connecting device of the first embodiment from a separated position to an assembled position.
Figure 3:
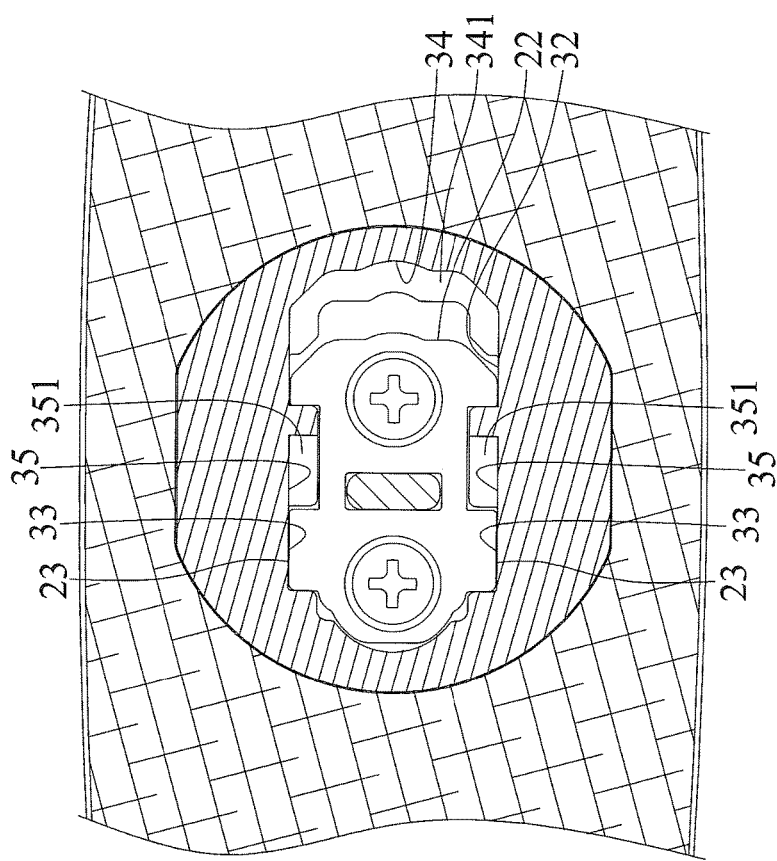
FIG. 3 is a cross sectional view taken along section line 3-3 of FIG. 2.
Figure 4:
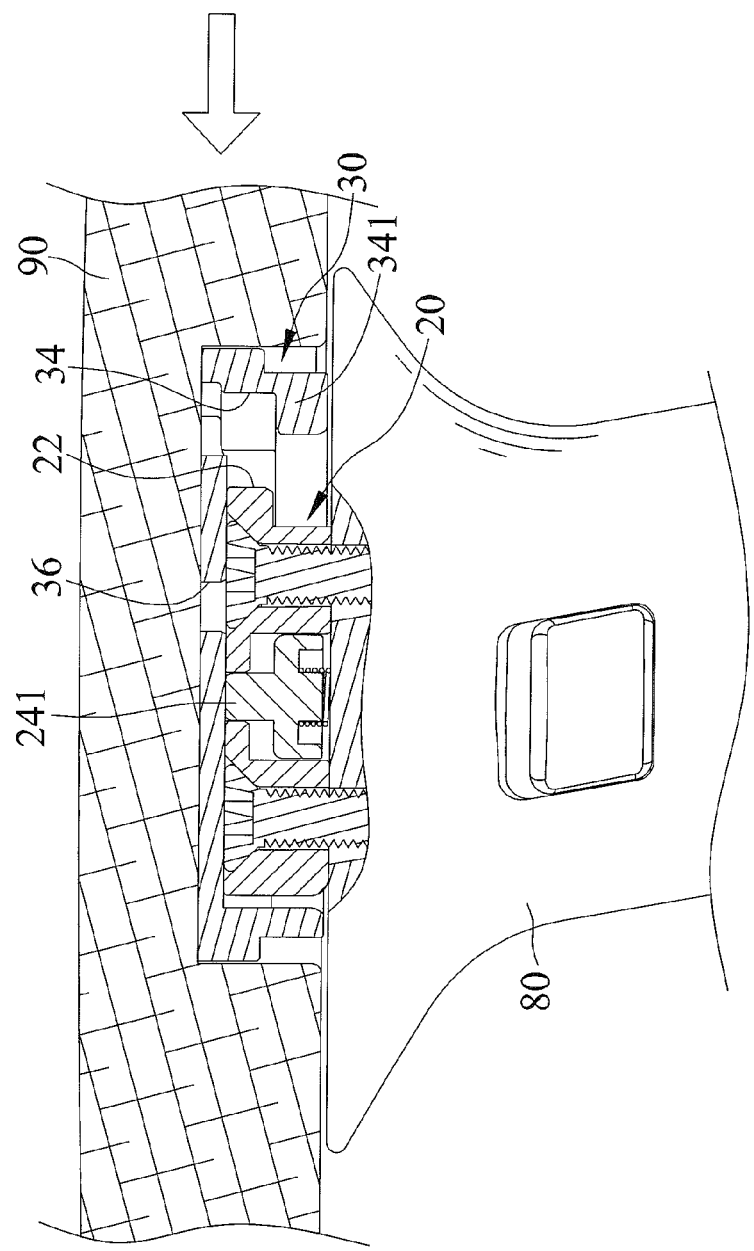
FIG. 4 is a diagrammatic view illustrating movement of the armrest connecting device of the first embodiment from a separated position to an assembled position.
Figure 5:
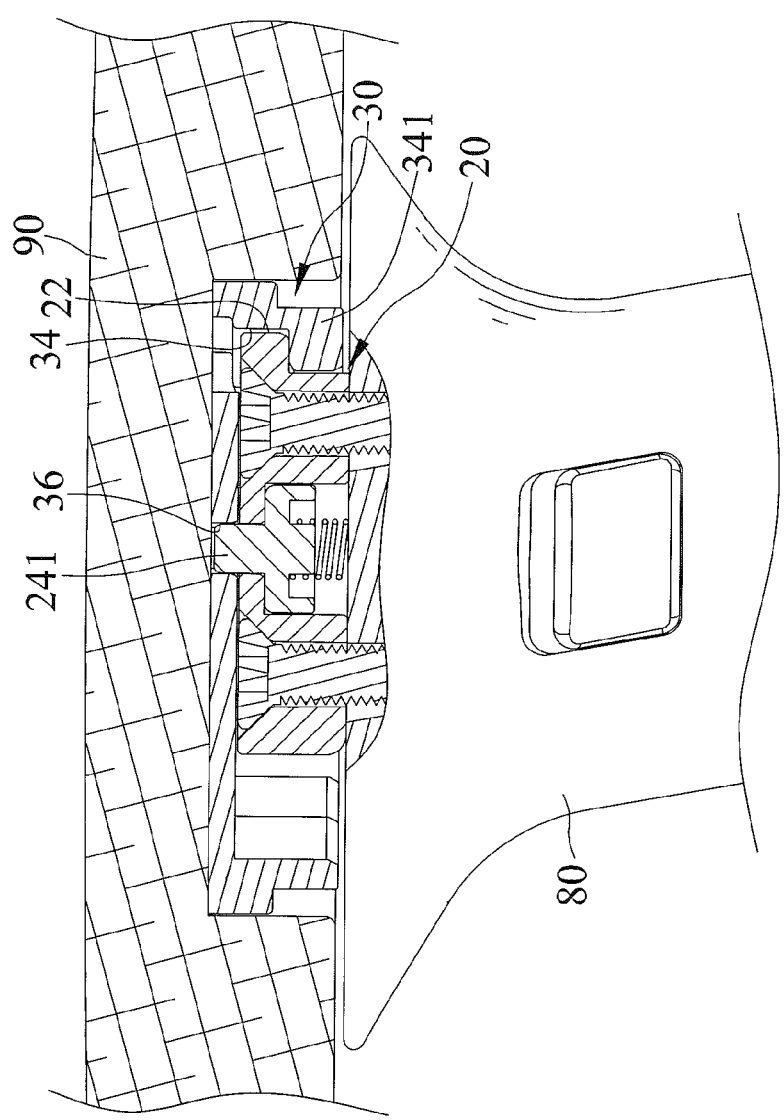
FIG. 5 is a diagrammatic cross sectional view of the armrest connecting device of the first embodiment in the assembled position.

With reference to FIGS. 1-5, a quick assembly armrest connecting device 10 according to the present invention includes a connecting head 20 and a receiving seat 30. The armrest connecting device 10 has two opposite sides respectively connected to a supporting frame 80 and an armrest pad 90 of an arm rest.

The connecting head 20 includes a body 21 extending along a first axis L1. The body 21 includes a first side 211 and a second side 212 opposite to the first side 211 along the first axis L1. A side of the body 21 of the connecting head 20 adjacent to the first side 211 includes a first protrusive sliding edge 22 extending in a radial direction of the first axis L1. The first protrusive sliding edge 22 is located on an end of the body 21 in the radial direction of the first axis L1. A side of the body 21 of the connecting head 20 adjacent to the first side 211 includes at least one second protrusive sliding edge 23 extending in a radial direction of the first axis L1. In this embodiment, the body 21 includes two second protrusive sliding edges 23 on opposite sides of the body 21 in the radial direction of the first axis L1 and extending away from each other. The second protrusive sliding edges 23 are located adjacent to the other end of the body 21 opposite to the end of the body 21 in the radial direction of the first axis L1.

The body 21 includes a slot 24 extending from the second side 212 through the first side 211. The slot 24 includes a first end located adjacent to the second side 212 of the body 21 and a second end located adjacent to the first side 211 of the body 21. A width of the first end of the slot 24 is larger than a width of the second end of the slot 24 to form a stepped structure. The slot 24 receives an engagement block 241 and an elastic element 242. The engagement block 241 is located adjacent to the first side 211 of the body 21 and selectively protrudes beyond an outer face of the body 21 adjacent to the first side 211. The elastic element 242 is located adjacent to the second side 212 of the body 21 and abuts the engagement block 241.

The body 21 further includes two through-holes 25 extending from the first side 211 through the second side 212 of the body 21 and located on opposite sides of the slot 24. A fastener 251 is mounted in each of the two through-holes 25, protrudes beyond an outer face of the body 21 located adjacent to the second side 212 of the body 21, and is fixed to the supporting frame 80, thereby fixing and connecting the body 21 of the connecting head 20 to the supporting frame 80.

The receiving seat 30 is fixed and connected to the armrest pad 90. The receiving seat 30 includes a groove 31 extending along a second axis L2 and having an opening. The groove 31 includes a top side 311 formed on a side thereof adjacent to the opening. The groove 31 further includes a bottom side 312 spaced from the top side 311 along the second axis L2. The groove 31 of the receiving seat 30 is recessed in a radial direction of the second axis L2 to form a first recessed sliding edge 32. The first recessed sliding edge 32 extends from the top side 311 to the bottom side 312. The first recessed sliding edge 32 is located in an end of the groove 31 in a radial direction of the second axis L2. The receiving seat 30 further includes at least one second recessed sliding edge 33 defined in a side of the bottom groove 31 and extending in a radial direction of the second axis L2. The at least one second recessed sliding edge 33 extends from the top side 311 to the bottom side 312 of the groove 31. The at least one second recessed sliding edge 33 is located in the other end of the groove 31 opposite to the end of the groove 31 in the radial direction of the second axis L2. In this embodiment, the receiving seat 30 includes two second recessed sliding edges 33 on opposite sides of the groove 31 in the radial direction of the second axis L2 and extending away from each other.

A side of the groove 31 adjacent to the bottom side 312 is recessed in a radial direction of the second axis L2 to form a first recessed engagement edge 34. The first recessed engagement edge 34 includes a side in communication with the first recessed sliding edge 32. The first recessed engagement edge 34 further includes another side adjacent to the top side 311 of the groove 31 and having a first stop edge 341. The first stop edge 341 is contiguous to the first recessed sliding edge 32.

A side of the groove 31 of the receiving seat 30 adjacent to the bottom side 312 of the groove 31 includes at least one second recessed engagement edge 35 extending in a radial direction of the second axis L2. The at least one second recessed engagement edge 35 has a first side intercommunicated with the second recessed sliding edge 33 and a second side intercommunicated with the groove 31. A side of the at least one second recessed engagement edge 35 adjacent to the top side 311 includes a second stop edge 351. The second stop edge 351 includes a first side contiguous to the at least one second recessed sliding edge 33 and a second side contiguous to the groove 31. In this embodiment, the receiving seat 30 includes two second recessed engagement edges 35 respectively corresponding to the two second recessed sliding edges 33. A positioning groove 36 is defined in the bottom side 312 of the groove 31 of the receiving seat 30 and extends away from the top side 311 along the second axis L2.

The armrest connecting device 10 is movable between a separated position and an assembled position. When the armrest connecting device 10 is in the separated position, the connecting head 20 is separated from the receiving seat 30. When the armrest connecting device 10 moves from the separated position towards the assembled position, the first axis L1 is parallel to the second axis L2, and the connecting head 20 moves rectilinearly along the second axis L2 towards the receiving seat 30 and inserts the body 21 into the groove 31. The first protrusive sliding edge 22 slides and aligns with the first recessed sliding edge 32. The at least one second protrusive sliding edge 23 slides and aligns with the at least one second recessed sliding edge 33. After the connecting head 20 abuts the bottom side 312 of the groove 31, the connecting head 20 moves rectilinearly in a radial direction of the second axis L2 relative to the receiving seat 30, moving the armrest connecting device 10 to the assembled position. When the armrest connecting device 10 is in the assembled position, the first protrusive sliding edge 22 is inserted into the first recessed engagement edge 34. The at least one second protrusive sliding edge 23 is inserted into the at least one second recessed engagement edge 35. The engagement block 241 is inserted into the positioning groove 36. Thus, the connecting head 20 is coupled with the receiving seat 30.

When the armrest connecting device 10 is in the assembled position, the receiving seat 30 can use the first recessed engagement edge 34 and the at least one second recessed engagement edge 35 to stop the first protrusive sliding edge 22 and the at least one second protrusive sliding edge 23, preventing the connecting head 20 from disengaging from the receiving head 30 by moving along the second axis L2. Furthermore, the engagement block 241 inserted into the positioning groove 36 prevents the connecting head 20 from moving relative to the receiving seat 30 in the radial direction of the second axis L2, achieving a secure assembling effect. Furthermore, during movement of the armrest connecting device 10 from the separated position to the assembled position, the connecting head 20 is moved rectilinearly relative to the receiving seat 30 twice or the receiving seat 30 is moved rectilinearly relative to the connecting head 20 twice to complete the assembly, providing easy and fast assembly.

Figure 6:
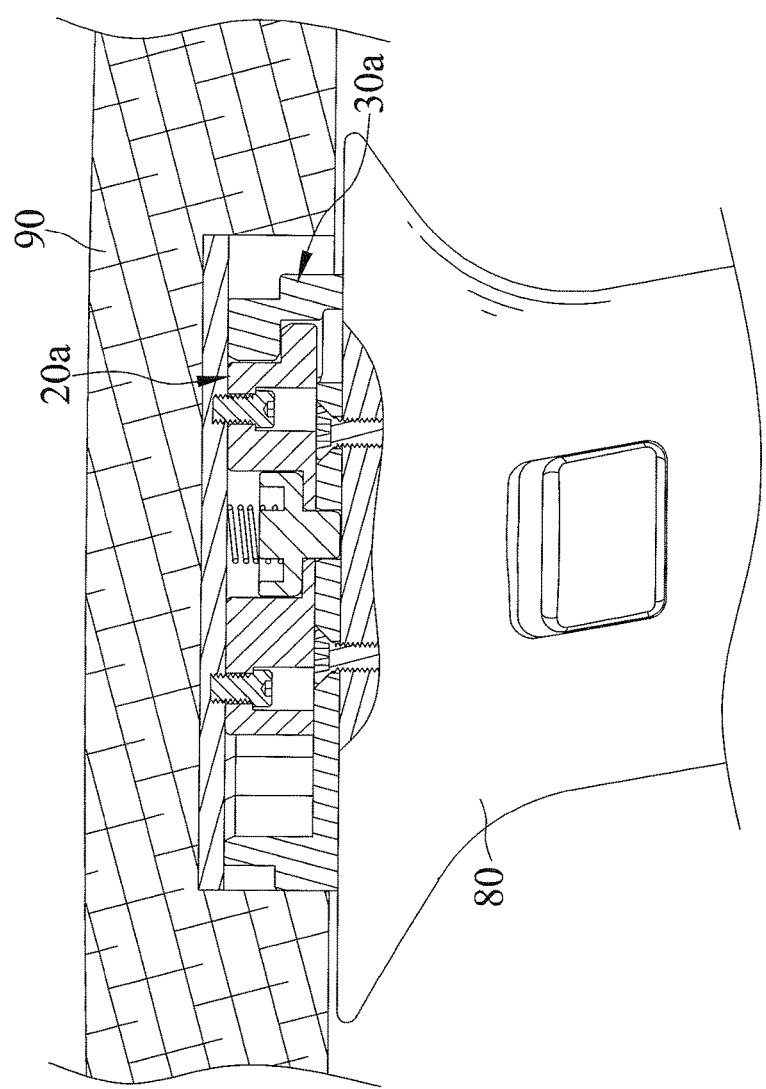
FIG. 6 is a diagrammatic cross sectional view of a quick assembly armrest connecting device of a second embodiment according to the present invention in the assembled position.

FIG. 6 shows a quick assembly armrest connecting device of a second embodiment according to the present invention in the assembled position. The second embodiment is substantially the same as the first embodiment, except that the connecting head 20a is fixed and connected to the armrest pad 90, and the receiving seat 30a is fixed and connected to the supporting frame 80. Even though the components connected to the connecting head 20a and the receiving seat 30a are exchanged, the assembly can still be achieved in the same way to achieve the same effect.

Figure 7:
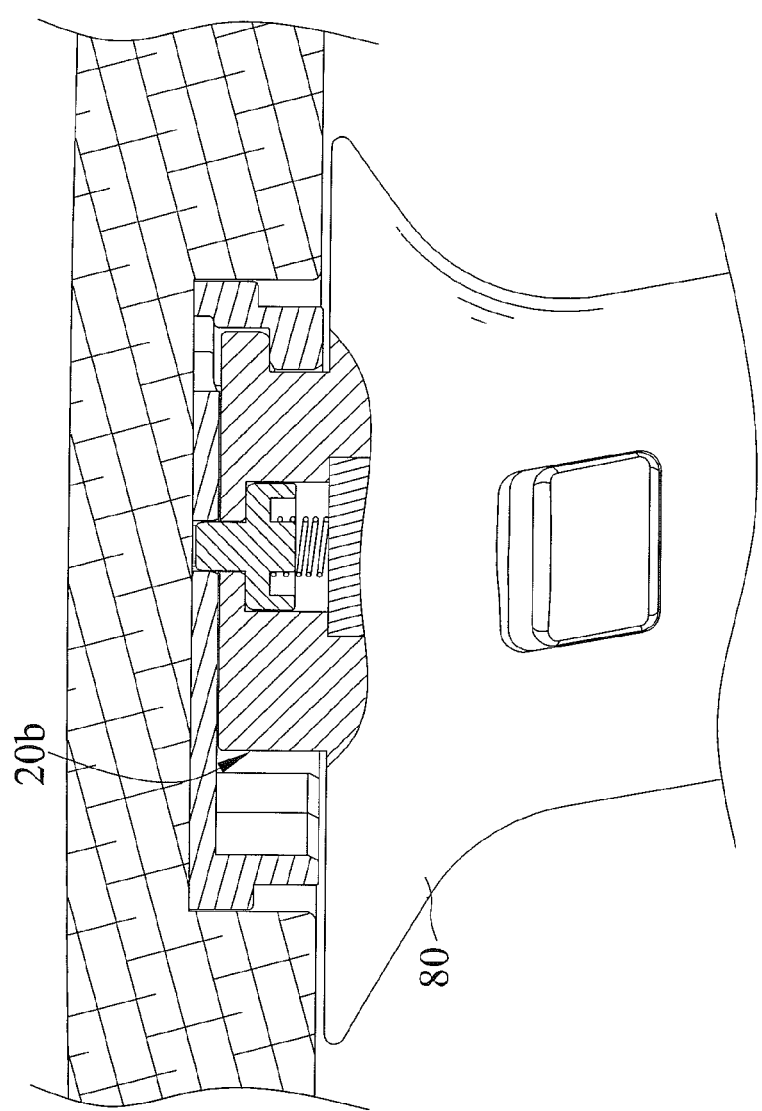
FIG. 7 is a diagrammatic cross sectional view of a quick assembly armrest connecting device of a third embodiment according to the present invention in the assembled position.

FIG. 7 shows a quick assembly armrest connecting device of a third embodiment according to the present invention in the assembled position. The third embodiment is substantially the same as the first embodiment, except that the connecting head 20b is fixed and connected to the supporting frame 80 by integral formation, reducing the number of parts for an armrest of an office chair, simplifying the armrest structure, and permitting easy assembly of the armrest.

Figure 8:
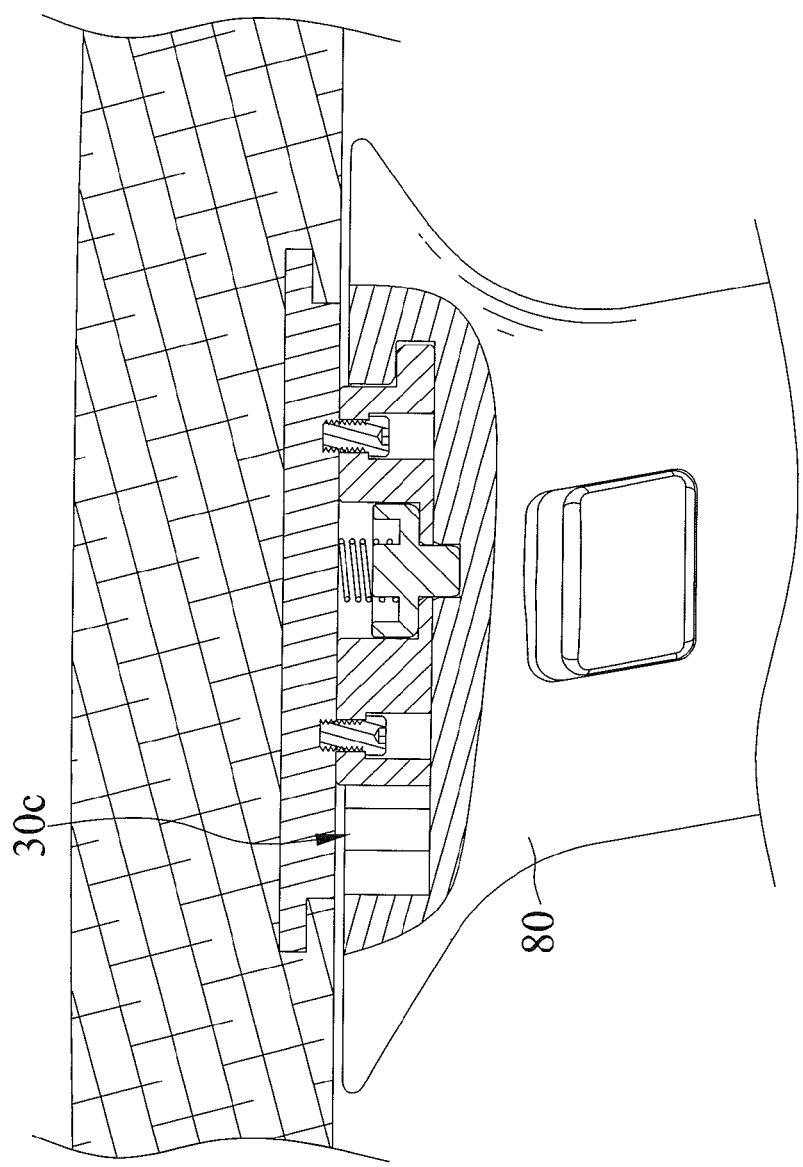
FIG. 8 is a diagrammatic cross sectional view of a quick assembly armrest connecting device of a fourth embodiment according to the present invention in the assembled position.

FIG. 8 is a diagrammatic cross sectional view of a quick assembly armrest connecting device of a fourth embodiment according to the present invention in the assembled position. The fourth embodiment is substantially the same as the second embodiment, except that the receiving seat 30c is fixed and connected to the supporting frame 80 by integral formation reducing the number of parts for an armrest of an office chair, simplifying the armrest structure, and permitting easy assembly of the armrest.

In view of the foregoing, the present invention has the following advantages. Firstly, the armrest connecting device 10 includes a connecting head 20 and a receiving seat 30. The connecting head 20 includes a body 21 extending along a first axis L1. The receiving seat 30 includes a groove 31 extending along a second axis L2. The groove 31 includes a top side 311 formed on a side thereof adjacent to the opening of the groove 31. The groove 311 further includes a bottom side 312 spaced from the top side 311 along the second axis L2. The armrest connecting device 10 is movable between a separated position and an assembled position. When the armrest connecting device 10 is in the separated position, the connecting head 20 is separated from the receiving seat 30. When the armrest connecting device 10 moves from the separated position towards the assembled position, the first axis L1 is parallel to the second axis L2, and the connecting head 20 moves rectilinearly along the second axis L2 towards the receiving seat 30 and inserts the body 21 into the groove 31. After the connecting head 20 abuts the bottom side 312 of the groove 31, the connecting head 20 moves rectilinearly in a radial direction of the second axis L2 relative to the receiving seat 30, moving the armrest connecting device 10 to the assembled position. Furthermore, during movement of the armrest connecting device 10 from the separated position to the assembled position, only the connecting head 20 or the receiving seat 30 is moved twice to complete the assembly, providing easy and fast assembly.

Although specific embodiments have been illustrated and described, numerous modifications and variations are still possible without departing from the scope of the invention. The scope of the invention is limited by the accompanying claims.

The invention claimed is:

1. A quick assembly armrest connecting device, with the armrest connecting device having two opposite sides respectively connected to a supporting frame and an armrest pad of an arm rest, with the armrest connecting device comprising:

a connecting head including a body extending along a first axis, with the body including a first side and a second side opposite to the first side along the first axis, with a side of the body of the connecting head adjacent to the first side including a first protrusive sliding edge extending in a radial direction of the first axis, with the groove of the receiving seat recessed in a radial direction of the second axis to form a first recessed sliding edge, with the first recessed sliding edge extending from the top side to the bottom side, wherein a side of the groove adjacent to the bottom side is recessed in a radial direction of the second axis to form a first recessed engagement edge, with the first recessed engagement edge including a side in communication with the first recessed sliding edge, and with the first recessed engagement edge further including another side located adjacent to the top side and having a first stop edge contiguous to the first recessed sliding edge, with the body including a slot extending from the second side through the first side, with the slot including a first end located adjacent to the second side of the body and a second end located adjacent to the first side of the body, with a width of the first end of the slot being larger than a width of the second end of the slot to form a stepped structure, with the slot receiving an engagement block and an elastic element, with the engagement block located adjacent to the first side of the body and selectively protruding beyond an outer face of the body adjacent to the first side, with the elastic element located adjacent to the second side of the body and abutting the engagement block; and a receiving seat including a groove extending along a second axis, with the groove including an opening, with the groove further including a top side formed on a side thereof adjacent to the opening, and with the groove further including a bottom side spaced from the top side along the second axis, with a positioning groove defined in the bottom side of the groove of the receiving seat and extending away from the top side along the second axis, wherein the armrest connecting device is movable between a separated position and an assembled position, wherein when the armrest connecting device is in the separated position, the connecting head is separated from the receiving seat, wherein when the armrest connecting device moves from the separated position towards the assembled position, the first axis is parallel to the second axis, the connecting head moves rectilinearly along the second axis towards the receiving seat and inserts the body into the groove, wherein after the connecting head abuts the bottom side of the groove, the connecting head moves rectilinearly in a radial direction of the second axis relative to the receiving seat, moving the armrest connecting device to the assembled position, wherein the engagement block is inserted into the positioning groove when the armrest connecting device is in the assembled position, and wherein when the armrest connecting device moves from the separated position towards the assembled position, the first protrusive sliding edge slides and aligns with the first recessed sliding edge, and wherein when the armrest connecting device is in the assembled position, the first protrusive sliding edge is inserted into the first recessed engagement edge.

2. The quick assembly armrest connecting device as claimed in claim 1, with a side of the body of the connecting head adjacent to the first side including at least one second protrusive sliding edge extending in a radial direction of the first axis, with the receiving seat further including at least one second recessed sliding edge defined in a side of the bottom groove and extending in a radial direction of the second axis, with the at least one second recessed sliding edge extending from the top side to the bottom side of the groove, with a side of the groove of the receiving seat adjacent to the bottom side of the groove including at least one second recessed engagement edge extending in a radial direction of the second axis, with the at least one second recessed engagement edge having a first side intercommunicated with the second recessed sliding edge and a second side intercommunicated with the groove, with a side of the at least one second recessed engagement edge adjacent to the top side including a second stop edge, with the second stop edge including a first side contiguous to the at least one second recessed sliding edge and a second side contiguous to the groove, wherein when the armrest connecting device moves from the separated position towards the assembled position, the at least one second protrusive sliding edge slides and aligns with the at least one second recessed sliding edge, and wherein when the armrest connecting device is in the assembled position, the at least one second protrusive edge is inserted into the at least one second recessed engagement edge.

3. The quick assembly armrest connecting device as claimed in claim 2, with the first protrusive sliding edge located on an end of the body in the radial direction of the first axis, with the at least one second protrusive sliding edge located adjacent to another end of the body opposite to the end of the body in the radial direction of the first axis, with the first recessed sliding edge located in an end of the groove in a radial direction of the second axis, and with the at least one second recessed sliding edge located in another end of the groove opposite to the end of the groove in the radial direction of the second axis.

4. The quick assembly armrest connecting device as claimed in claim 3, with the at least one second protrusive sliding edge including two second protrusive sliding edges on opposite sides of the body in the radial direction of the first axis and extending away from each other, with the at least one second recessed sliding edges including two second recessed sliding edges on opposite sides of the groove in the radial direction of the second axis and extending away from each other, and with the at least one second recessed engagement edge including two second recessed engagement edges respectively corresponding to the two second recessed sliding edges.

5. The quick assembly armrest connecting device as claimed in claim 4, with the body further including two through-holes extending from the first side through the second side of the body and located on opposite sides of the slot, and with a fastener mounted in each of the two through-holes and protruding beyond an outer face of the body located adjacent to the second side of the body.

6. The quick assembly armrest connecting device as claimed in claim 1, wherein the connecting head is fixed and connected to the supporting frame, and wherein the receiving seat is fixed to the armrest pad.

7. The quick assembly armrest connecting device as claimed in claim 3, wherein the connecting head is fixed and connected to the armrest pad, and wherein the receiving seat is fixed and connected to the supporting frame.

8. The quick assembly armrest connecting device as claimed in claim 3, wherein the connecting head is fixed and connected to the supporting frame by integral formation, and wherein the receiving seat is fixed and connected to the armrest pad.

9. The quick assembly armrest connecting device as claimed in claim 1, wherein the receiving seat is fixed and connected to the supporting frame by integral formation, and wherein the receiving seat is fixed and connected to the supporting frame.

\* \* \* \* \*